(12) United States Patent
Tanba et al.

(10) Patent No.: US 8,771,135 B2
(45) Date of Patent: Jul. 8, 2014

(54) HYBRID POWER DRIVE APPARATUS

(75) Inventors: Toshio Tanba, Nishio (JP); Yuichi Fukuhara, Nishio (JP); Kan Sasaki, Nishio (JP); Mitsuhiro Tabata, Toyota (JP); Masahiro Omura, Kariya (JP)

(73) Assignees: Aisin AI Co., Ltd., Nishio-Shi, Aichi-Ken (JP); Toyota Jidosha Kabushiki Kaisha, Toyota-Shi, Aichi-Ken (JP); Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 780 days.

(21) Appl. No.: 12/988,687

(22) PCT Filed: Apr. 17, 2009

(86) PCT No.: PCT/JP2009/057796
§ 371 (c)(1),
(2), (4) Date: Apr. 8, 2011

(87) PCT Pub. No.: WO2009/131077
PCT Pub. Date: Oct. 29, 2009

(65) Prior Publication Data
US 2011/0174558 A1   Jul. 21, 2011

(30) Foreign Application Priority Data

Apr. 21, 2008   (JP) .................................. 2008-110543

(51) Int. Cl.
*B60W 10/02*   (2006.01)
(52) U.S. Cl.
USPC ............................................................ 477/5
(58) Field of Classification Search
USPC .................................. 477/5; 74/331, 335, 340
See application file for complete search history.

(56) References Cited

U.S. PATENT DOCUMENTS 7,040,186 B2 *   5/2006   Pollak ............................ 74/330
2002/0033059 A1   3/2002   Pels et al.
(Continued)

FOREIGN PATENT DOCUMENTS

EP   1 714 817 A1   10/2006
JP   2002-89594 A   3/2002
(Continued)

OTHER PUBLICATIONS

Supplementary European Search Report and European Search Opinion issued on Jun. 17, 2011 by the European Patent Office in corresponding European Application No. 09733979.0.

(Continued)

*Primary Examiner* — Erin D Bishop
*Assistant Examiner* — Huan Le
(74) *Attorney, Agent, or Firm* — Buchanan Ingersoll & Rooney PC

(57) ABSTRACT

[Subject]
In a hybrid drive power apparatus, loss of drive power caused by drag torque of a friction clutch is decreased to reduce fuel consumption rate.
[Solution]
A hybrid drive power apparatus of the type which comprises a first gear-shift mechanism assembled with a first input shaft to be applied with drive power from an engine through a first friction clutch, a second gear-shift mechanism assembled with a second input shaft to be applied with the drive power of the engine through a second friction clutch, a motor-generator in drive connection with the second input shaft, a final output shaft in drive connection with each output shaft of both the gear-shift mechanisms, and a driven mechanism to be driven by drive power transferred from the final output shaft, wherein drive torque of the motor-generator activated as an electric motor is transferred to the final output shaft through a gear set as a shift step selected in the second gear-shift mechanism, wherein the hybrid drive power apparatus includes control means for activating the motor-generator as the electric motor in a condition where the first friction clutch is brought into engagement to transfer drive torque of the engine to the final output shaft through the first input shaft and the first gear-shift mechanism and for engaging the second friction clutch after activation of the motor-generator so that the final output shaft is applied with drive torque of the motor-generator activated as the electric motor and the drive torque of the engine through the first input shaft and the first gear-shift mechanism.

3 Claims, 8 Drawing Sheets

(56) References Cited

U.S. PATENT DOCUMENTS

| | | | |
|---|---|---|---|
| 2002/0088291 A1* | 7/2002 | Bowen | 74/339 |
| 2002/0177504 A1 | 11/2002 | Pels et al. | |
| 2003/0069103 A1* | 4/2003 | Ibamoto et al. | 475/5 |
| 2005/0101432 A1* | 5/2005 | Pels et al. | 477/5 |
| 2005/0139035 A1 | 6/2005 | Lee et al. | |
| 2006/0130601 A1* | 6/2006 | Hughes | 74/340 |
| 2006/0230855 A1 | 10/2006 | Leibbrandt et al. | |
| 2006/0258506 A1 | 11/2006 | Ibamoto et al. | |
| 2009/0176617 A1* | 7/2009 | Dilzer | 477/5 |

FOREIGN PATENT DOCUMENTS

| | | |
|---|---|---|
| JP | 2003-237393 A | 8/2003 |
| JP | 2005-186931 A | 7/2005 |

OTHER PUBLICATIONS

International Search Report (PCT/ISA/210) issued on Jun. 30, 2009, by Japanese Patent Office as the International Searching Authority for International Application No. PCT/JP2009/057796.

* cited by examiner

HYBRID POWER DRIVE APPARATUS

BACKGROUND OF THE INVENTION

1. Field of the Invention

The present invention relates to a hybrid drive power apparatus for a motor vehicle, particularly to an improvement for decreasing loss of drive power caused in a power transmission of the dual-clutch type suitable for applied to a hybrid drive power apparatus.

2. Discussion of the Prior Art

Disclosed in Japanese Patent Laid-open Publication No. 2005-186931 is a hybrid drive power apparatus provided with a power transmission of this type. The hybrid drive power apparatus includes first and second input shafts arranged to be selectively rotated by drive power of an engine transmitted thereto through a dual-clutch, first and second gear-shift mechanisms respectively assembled with first and second output shafts in parallel with the first and second input shafts, and a motor-generator in drive connection with the second output shaft to be activated as an electric motor for driving a set of driven road wheels through a final output shaft in drive connection with the first or second output shaft when supplied with electric power from a battery and to be activated as a generator for charging the battery when driven by the driven road wheels.

3. Problems to be Solved

In the hybrid drive power apparatus, the first and second friction clutches are alternately engaged to selectively transfer drive power of the engine to the first or second input shaft so that the drive power is transferred to the final output shaft in drive connection to the drive road wheels at a shift step selected in the first or second gear-shift mechanism. When the motor-generator in drive connection with the second input shaft is activated as an electric motor, drive power of the motor-generator is transferred to the final output shaft through the second input shaft and the second gear-shift mechanism. Assuming that the motor-generator is activated as the electric motor in a condition where the first friction clutch has been brought into engagement to transfer the drive power of the engine to the final output shaft through the first gear-shift mechanism, the drive power of the motor-generator is transferred to the final output shaft through the second input shaft and the second gear-shift mechanism. In such an instance, the second friction clutch is released for disengagement during which the input and output members of the second friction clutch are forced to relatively rotate since a change-speed ratio between the output shaft of the first gear-shift mechanism and the input member of the first friction clutch is different from a change-speed ratio between the output shaft of the second gear-shift mechanism and the input member of the second friction clutch. Even when the second friction clutch is in a released condition, drag torque is caused by friction resistance between the input and output members of the second friction clutch. The occurrence of such drag torque causes loss of the drive power. In the case that a wet-type friction clutch is used as the second friction clutch, the drag torque becomes large, resulting in increase of loss of the drive power.

SUMMARY OF THE INVENTION

It is, therefore, an object of the present invention to decrease loss of the drive power caused by the foregoing drag torque for reducing fuel consumption rate.

According to the present invention, the object is accomplished by providing a hybrid drive power apparatus of the type which comprises a first gear-shift mechanism assembled with a first input shaft to be applied with drive power from an engine through a first friction clutch, a second gear-shift mechanism assembled with a second input shaft to be applied with the drive power of the engine through a second friction clutch, a motor-generator in drive connection with the second input shaft, a final output shaft in drive connection with each output shaft of both the gear-shift mechanisms, and a driven mechanism to be driven by drive power transferred from the final output shaft, wherein drive torque of the motor-generator activated as an electric motor is transferred to the final output shaft through a gear set at a shift step selected in the second gear-shift mechanism, wherein the hybrid drive power apparatus includes control means for activating the motor-generator as the electric motor to start the engine in a condition where the second friction clutch has been brought into engagement to transfer drive torque of the motor-generator to the engine, for disengaging the second friction clutch after start of the engine and for engaging both the first and the second friction clutches when either one of the shift steps in the first gear-shift mechanism is selected to transfer the drive torque of the engine and the motor-generator to the final output shaft through a gear set at the selected shift step in the first gear-shift mechanism.

In a practical embodiment of the present invention, there is provided a hybrid drive power apparatus of the type which comprises a first gear-shift mechanism assembled with a first input shaft to be applied with drive power from an engine through a first friction clutch, a second gear-shift mechanism assembled with a second input shaft to be applied with the drive power of the engine through a second friction clutch, a motor-generator in drive connection with the first input shaft, a final output shaft in drive connection with each output shaft of both the gear-shift mechanisms, and a driven mechanism to be driven by drive power transferred from the final output shaft, wherein drive torque of the motor-generator activated as an electric motor is transferred to the final output shaft through a gear set at a shift step selected in the first gear-shift mechanism, wherein the hybrid drive power apparatus includes control means for activating the motor-generator as the electric motor to start the engine in a condition where the first friction clutch has been brought into engagement to transfer drive torque of the motor generator to the engine, for disengaging the first friction clutch after start of the engine and for engaging both the first and second friction clutches when either one of the shift steps in the second gear-shift mechanism is selected to transfer the drive torque of the engine and the motor-generator to the final output shaft through a gear set at the selected shift step in the second gear-shift mechanism.

In another embodiment, the first gear-shift mechanism may be provided with gear sets for change-speed at odd shift steps, while the second gear-shift mechanism may be provided with gear sets for change-speed at even shift steps.

Advantages:

In the hybrid drive power apparatus of the present invention, the control mean for controlling operation of the dual clutch in the form of the first and second friction clutches, shift operation of both the gear-shift mechanisms and operation of the motor-generator is arranged to activate the motor-generator as the electric motor in a condition where the first friction clutch has been brought into engagement to transfer drive torque of the engine to the final output shaft through the first input shaft and the first gear-shift mechanism and to bring the second friction clutch into engagement after activation of the motor-generator so that the final output shaft is applied with drive torque of the motor-generator activated as the electric motor and the drive torque of the engine through the first input shaft and the first gear-shift mechanism. With such control, both the first and second friction clutches are engaged when the final output shaft is applied with drive torque of the motor-generator activated as the electric motor and the drive torque of the engine through the first gear-shift mechanism. This is effective to eliminate drag torque caused by relative rotation of the input and output members in the second friction clutch for decreasing loss of the drive power.

DESCRIPTION OF THE PREFERRED EMBODIMENTS

Figure 1:
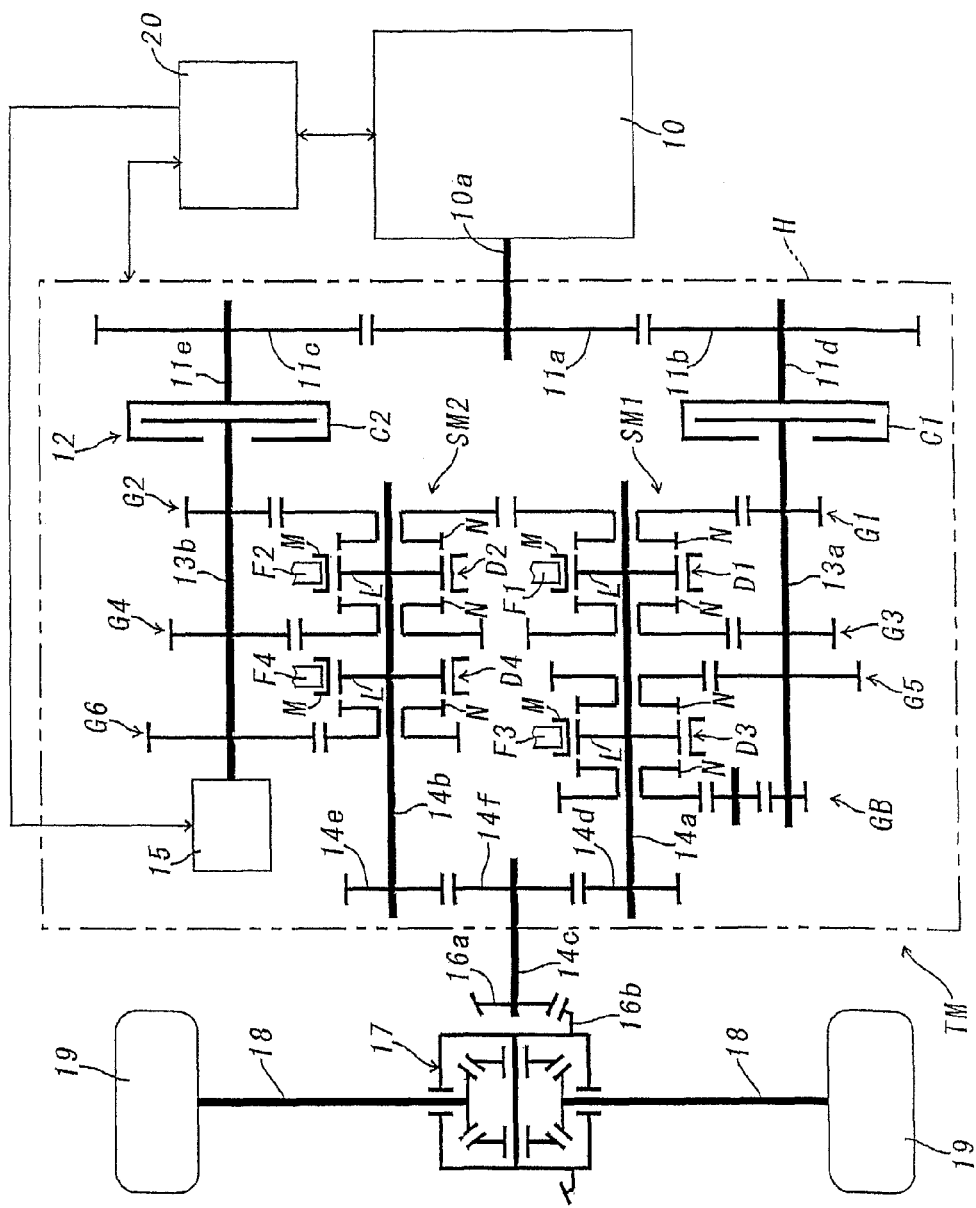
FIG. 1 is a skeleton view illustrating the whole construction of a hybrid drive power apparatus in a preferred embodiment of the present invention.

Hereinafter, a first embodiment of a hybrid drive power apparatus in accordance with the present invention will be described with reference to FIG. 1~6. In this embodiment, a control system of the hybrid drive power apparatus is adapted to an automatic power transmission TM of forward six speed steps and a backward step.

The automatic power transmission TM is in the form of a gear transmission of the dual-clutch type wherein a first input shaft 13a and a second input shaft 13b are rotatably mounted in parallel within a transmission housing H and drivingly connected to an output shaft 10a of an engine 10 through a first friction clutch C1 and a second friction clutch C2. An input member of first friction clutch C1 is connected to a support shaft 11d of a driven gear 11b in mesh with a drive gear 11a for rotation with the output shaft 10a of engine 10. Similarly, an input member of friction clutch C2 is connected to a support shaft 11e of a driven gear 11c in mesh with the drive gear 11a for rotation with the output shaft 10a of engine 10. A first output shaft 14a and a second output shaft 14b are arranged respectively in parallel with the input shafts 13a and 13b and drivingly connected to a final output shaft 14c through drive gears 14d and 14e in mesh with a driven gear 14f supported on the final output shaft 14c. The final output shaft 14c is drivingly connected to a set of driven road wheels 19 through a drive pinion 16a, a ring gear 16b, a differential gear 17 and a set of axle shafts 18, 18.

The first and second friction clutches C1 and C2 in the form of a dual-clutch 12 are brought into half engagement in transit of changeover of shift steps for change-speed to increase or decrease transfer torque relatively in reverse in a normal condition. After changeover of the shift step for change-speed, the dual-clutch 12 is operated under control of a controller 20 as described later so that one of the friction clutches is completely engaged to maximize the transfer torque, while the other friction clutch is completely disengaged to make the transfer torque zero (0).

A first gear-shift mechanism SM1 is provided between first input shaft 13a and first output shaft 14a, and a second gear-shift mechanism SM2 is provided between second input shaft 13b and second output shaft 14b. The first gear-shift mechanism SM1 includes gear sets G1, G3, G5 for first, third and fifth speed steps (odd steps for change-speed) and a reverse gear train GB for backward. Each drive gear of gear sets G1, G3, G5 and reverse gear train GB is fixedly supported on the first input shaft 13a for rotation therewith, and each driven gear of the gear sets and reverse gear train is rotatably supported on the first output shaft 14a. A first changeover clutch D1 is provided between the driven gear of first speed gear set G1 and the driven gear of third speed gear set G3 for selective connection with the first output shaft 14a. A third changeover clutch D3 is provided between the driven gear of fifth speed gear set G5 and the driven gear of reverse gear train GB for selective connection with the first output shaft 14a. An idle gear is interposed between the drive and driven gears of reverse drive train GB.

The second gear-shift mechanism SM2 includes gear sets G2, G4, G6 for second, fourth and sixth speed steps (even steps for change-speed). Each drive gear of the gear sets G2, G4, G6 is fixedly supported on the second input shaft 13b for rotation therewith, and each driven gear of the gear sets is rotatably supported on the second output shaft 14b. A second changeover clutch D2 is provided between the driven gear of second speed gear set G2 and the driven gear of fourth speed gear set G4 for selective connection with the second output shaft 14b. A fourth changeover clutch D4 is provided at one side of the driven gear of sixth speed gear set G6 for selective connection with the second output shaft 14b.

The changeover clutches D1~D4 each are in the form of a well known synchromesh mechanism which includes a clutch hub L respectively fixed to the first output shaft 14a and the second output shaft 14b and a shift sleeve (a shift member) M in splined engagement with the clutch hub. When shift forks F1~F4 are selectively shifted in an axial direction, the shift sleeve M is engaged with a side gear of the driven gear for selective connection with the clutch hub L.

In the automatic transmission TM of the embodiment, a motor-generator 15 is drivingly connected to the second input shaft 13b and operated under control of a controller 20. In a condition where the vehicle is traveling at a low speed or the output power of engine 10 is not sufficient, the controller 20 supplies electric power to the motor-generator 15 from a battery (not shown) to activate the motor-generator as an electric motor and cause the engine 10 to cooperate with the motor-generator for driving the driven road wheels 19. In a condition where the engine 10 is driven by the driven road wheels 19 or the output power of engine 10 is sufficient, the motor-generator 15 is driven by the second input shaft 13b to activate as a generator for charging the battery under control of the controller 20. Although in this embodiment, the motor-generator 15 is connected to one end of the second input shaft 13b, it may be drivingly connected to the first input shaft 13a.

Although in the automatic transmission TM, each drive gear of the gear sets G1~G6 is fixedly supported on the first input shaft 13a or the second input shaft 13b, each driven gear of the gear sets G1~G6 is rotatably supported on the first output shaft 14a or the second output shaft 14b, and the first~fourth changeover clutches D1~D4 are provided on the first output shaft 14a or the second output shaft 14b, a portion of the first~fourth changeover clutches D1~D4 may be provided on the first input shaft 13a or the second input shaft 13b in such manner that the drive gear is rotatably supported on the first input shaft 13a or the second input shaft 13b and that the driven gear is fixedly supported on the first output shaft 14a or the second output shaft 14b. In such a case, the motor-generator 15 may be provided on the first input shaft 13a.

Hereinafter, operation of the automatic transmission TM in the hybrid drive power apparatus will be described. Assuming that the vehicle is in a stopped condition, both the first and second friction clutches C1 and C2 are in a released condition, and each changeover clutch D1~D4 of the first and second gear-shift mechanisms SM1 and SM2 is in a neutral position. When the driven road wheels 19 are driven by drive power of the engine 10 to start the vehicle, a shift lever (not shown) of the power transmission is shifted to a forward position after start of the engine 10. In such an instance, the controller 20 causes the first shift fork F1 to shift the sleeve M of first changeover clutch D1 rightward so that a drive train at the first speed step is established by the first speed gear set G1 in the first gear-shift mechanism SM1. When the rotation speed of engine 10 exceeds a predetermined low speed, the controller 20 causes the first friction clutch C1 of dual-clutch 12 to gradually bring into engagement so that the drive torque of engine 10 is transmitted to the driven road wheels 19 through the first input shaft 13a, first speed gear set G1, first output shaft 14a, final output shaft 14c, differential gear 17 and axle shafts 18, 18 thereby to cause the vehicle to travel at the first speed.

Figure 2:
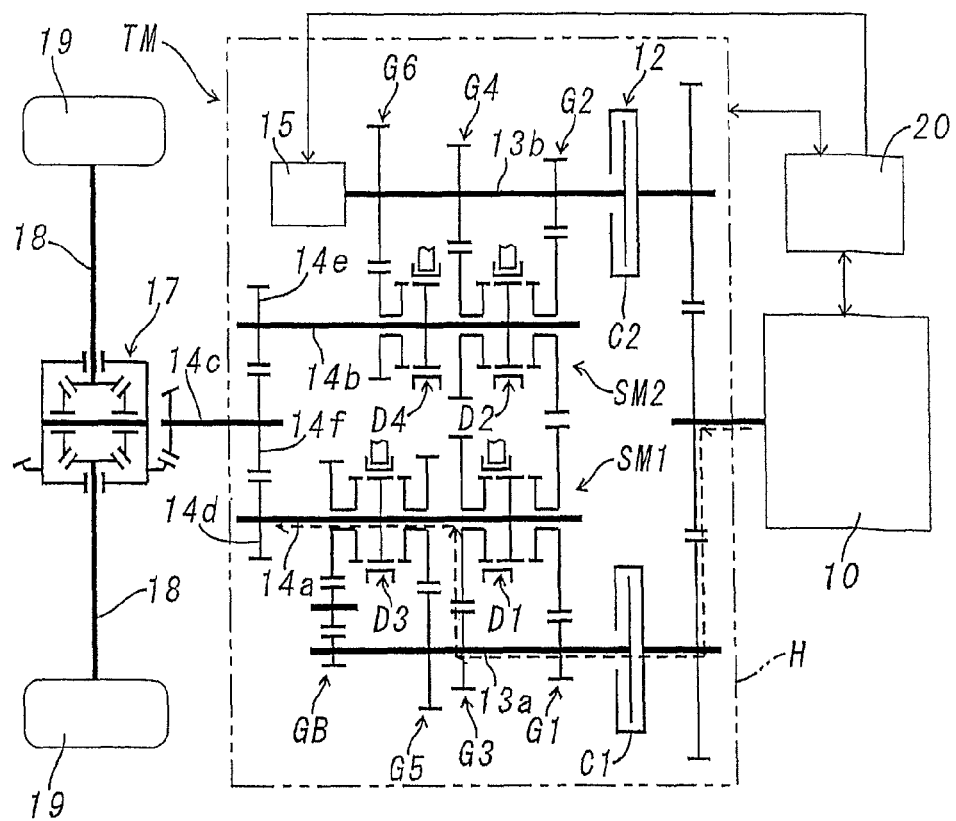
FIG. 2 is a skeleton view illustrating a condition where driven members are driven by an engine through a first friction clutch and a first gear-shift mechanism in the embodiment shown in FIG. 1.
Figure 3:
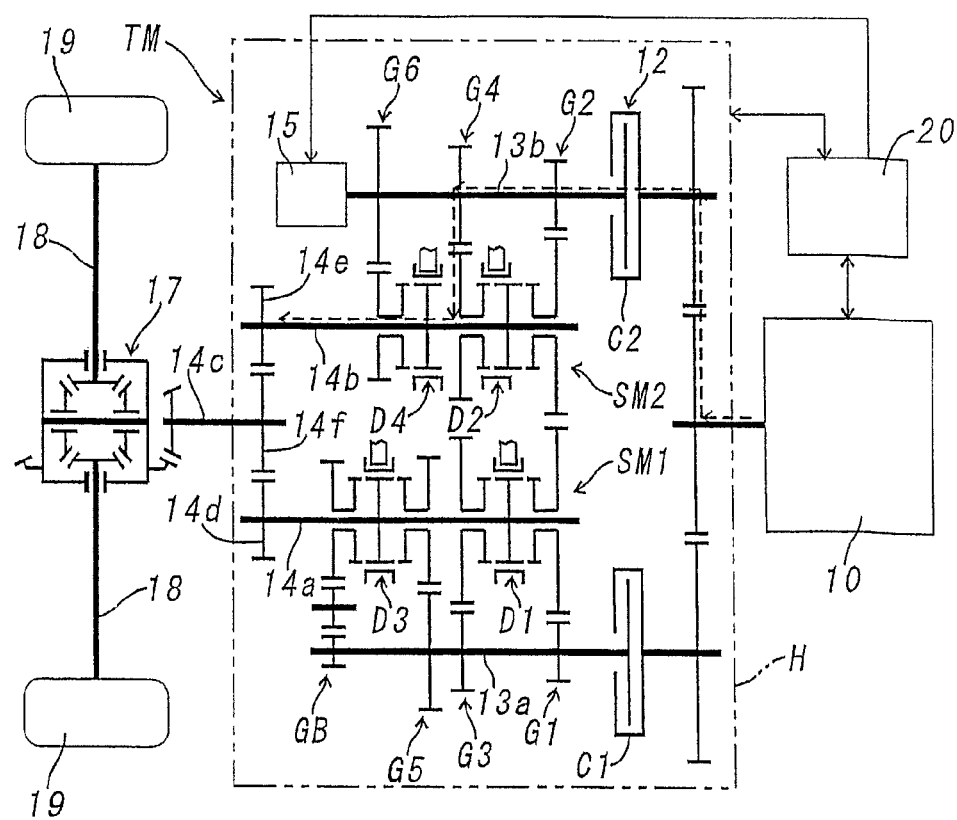
FIG. 3 is a skeleton view illustrating a condition where driven members are driven by the engine through a second friction clutch and a second gear-shift mechanism.

When the vehicle speed becomes suitable for travel at the second speed, the controller 20 causes the shift fork F2 to shift the sleeve M of second changeover clutch D2 rightward so that a drive train at the second speed step is established by the second speed gear set G2 in the second gear-shift mechanism SM2 and causes the second friction clutch C2 to engage after release of first friction clutch C1. After engagement of the second friction clutch C2, the controller 20 causes the shift fork F1 to return the sleeve M of first changeover clutch D1 to the neutral position. Thereafter, the controller 20 causes the first and second friction clutches C1 and C2 to alternately engage for sequentially establishing a drive train at the other speed step suitable for travel condition of the vehicle in a similar manner described above. In FIG. 2, an arrow of broken line represents the transfer path of drive power of engine 10 in a condition where the vehicle is traveling at the third speed step in the first gear-shift mechanism SM1. In FIG. 3, an arrow of broken line represents the transfer path of drive power of engine 10 in a condition where the vehicle is traveling at the fourth speed step in the second gear-shift mechanism SM2.

When the shift lever is shifted to a reverse position in a stopped condition of the vehicle, the controller 20 causes the shift fork F3 to shift the sleeve M of third changeover clutch D3 leftward for establishing a drive train at the reverse step. When the rotational speed of engine 10 increases, the controller 20 causes the first friction clutch C1 to gradually bring into engagement for transmitting the drive torque of engine 10 to the first output shaft 14a through the reverse gear train GB to effect backward movement of the vehicle.

Figure 4:
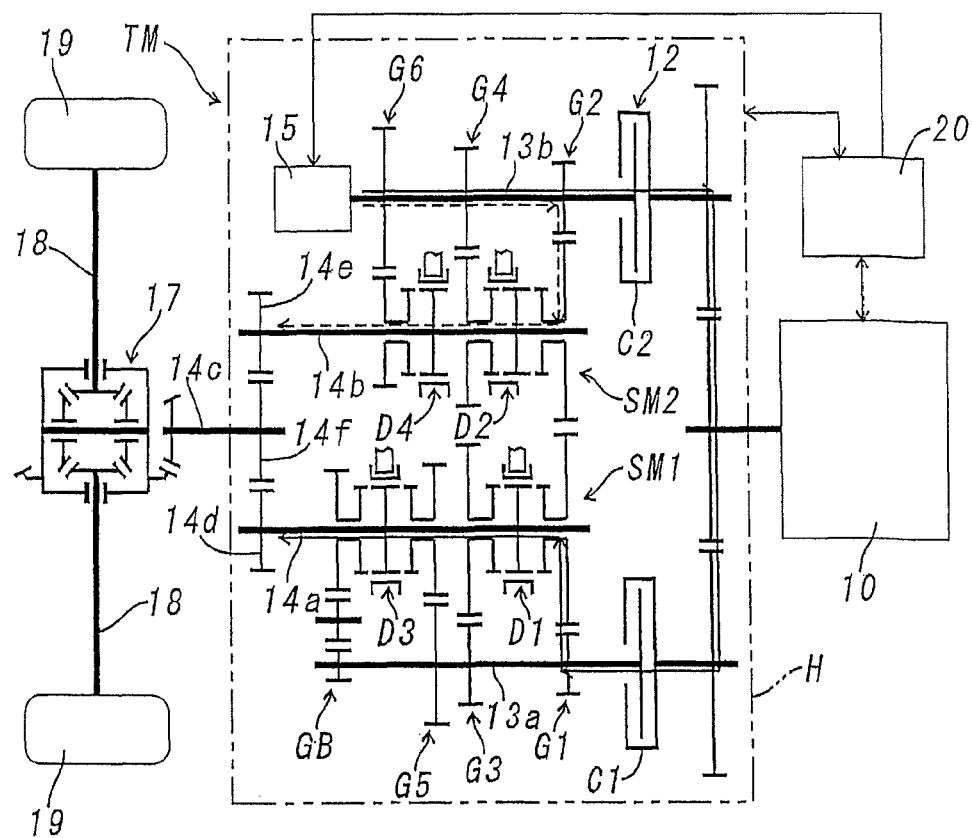
FIG. 4 is a skeleton view illustrating a condition where driven members are driven by the engine through the first and second gear-shift mechanisms in the embodiment shown in FIG. 1.

When the driven road wheels 19 are driven by drive torque of the motor-generator 15 to start the vehicle, the shift lever is shifted to the forward position in a stopped condition of the vehicle. In such an instance, the controller 20 establishes the drive train at the first speed step in the first gear-shift mechanism in the same manner as in travel of the vehicle effected by the drive torque of engine 10 described above, activates the motor-generator 15 as the electric motor in accordance with depression of the accelerator pedal and causes both the first and second friction clutches C1 and C2 to gradually bring into engagement so that the drive torque of motor-generator 15 is transmitted to the driven road wheels 19 through the second input shaft 13b, second and first friction clutches C2 and C1, first input shaft 13a, first speed gear set G1, first output shaft 14a, final output shaft 14c, differential gear 17 and axle shafts 18 thereby to cause the vehicle to start at the first speed. In FIG. 4, an arrow of solid line represents the transfer path of drive power of motor-generator 15 in a condition where the vehicle is traveling at the first speed.

When the travel condition of the vehicle becomes suitable for travel at the second speed, the controller 20 temporarily stops the supply of electric power to motor-generator 15, releases the engagement of both the friction clutches C1 and C2 and causes the first changeover clutch D1 to return to the neutral position. Thereafter, the controller 20 establishes the drive train at the second speed step in the second gear-shift mechanism SM2 in the same manner as the foregoing control and causes the motor-generator 15 to activate as the electric motor thereby to cause the vehicle to travel at the second speed. In FIG. 4, an arrow of broken line represents the transfer path of drive power of motor-generator 15 in a condition where the vehicle is traveling at the second speed.

Similarly to the foregoing control, the controller establishes a drive train at a shift step suitable for travel of the vehicle. When each shift step in the first gear-shift mechanism SM1 is selected, both the friction clutches C1 and C2 are brought into engagement under control of the controller 20. When each shift step in the second gear-shift mechanism SM2 is selected, engagement of both the friction clutches C1 and C2 is released, and a shift step suitable for travel of the vehicle is selected under control of the controller 20.

To start the engine 10 in a condition where the drive torque of motor-generator 15 is transmitted to the driven road wheels 19 through the second gear-shift mechanism SM2 as shown by a dotted line in FIG. 4, the second friction clutch C2 is brought into engagement under control of the controller 20 so that the engine is started by the drive torque of motor-generator 15 transferred from the second input shaft 13b. Subsequently, the controller 20 releases the engagement of second friction clutch C2 after start of the engine 10 and causes the changeover clutches D1~D4 to selectively shift so that a drive train is established by either one of change-speed gear sets G1~G4 selected in the first and second gear-shift mechanisms SM1 and SM2. When either one of the shift steps (for instance, the third speed step) is selected in the first gear-shift mechanism SM1, the controller 20 releases all the shift steps in the second gear-shift mechanism SM2 and causes the first and second friction clutches C1 and C2 to bring into engagement so that the drive torque of engine 10 is transferred to the drive road wheels 19 through the first friction clutch C1 at the shift step (for instance, the third speed step) selected in the first gear-shift mechanism SM1 and that the drive torque of motor-generator 15 is transferred to the driven road wheels 19 through the second and first friction clutches C2 and C1 at the shift step (for instance, the third speed step) selected in the first gear-shift mechanism SM1. (see an arrow of solid line and an arrow of dotted line in FIG. 5.

When either one of the shift steps (for instance, the fourth speed step) is selected in the second gear-shift mechanism SM2, the controller 20 causes only the second friction clutch C2 to bring into engagement without selection of the shift steps in the first gear-shift mechanism SM1 so that the drive torque of engine is transferred to the drive road wheels 19 through the second friction clutch C2 at either one of the shift steps (for instance, the fourth speed step) selected in the second gear-shift mechanism SM2 and that the drive torque of motor-generator 15 is transferred to the drive road wheels 19 at the shift step (for instance, the fourth speed step) selected in the second gear-shift mechanism SM2. (see an arrow of solid line and an arrow of dotted line in FIG. 6)

Figure 5:
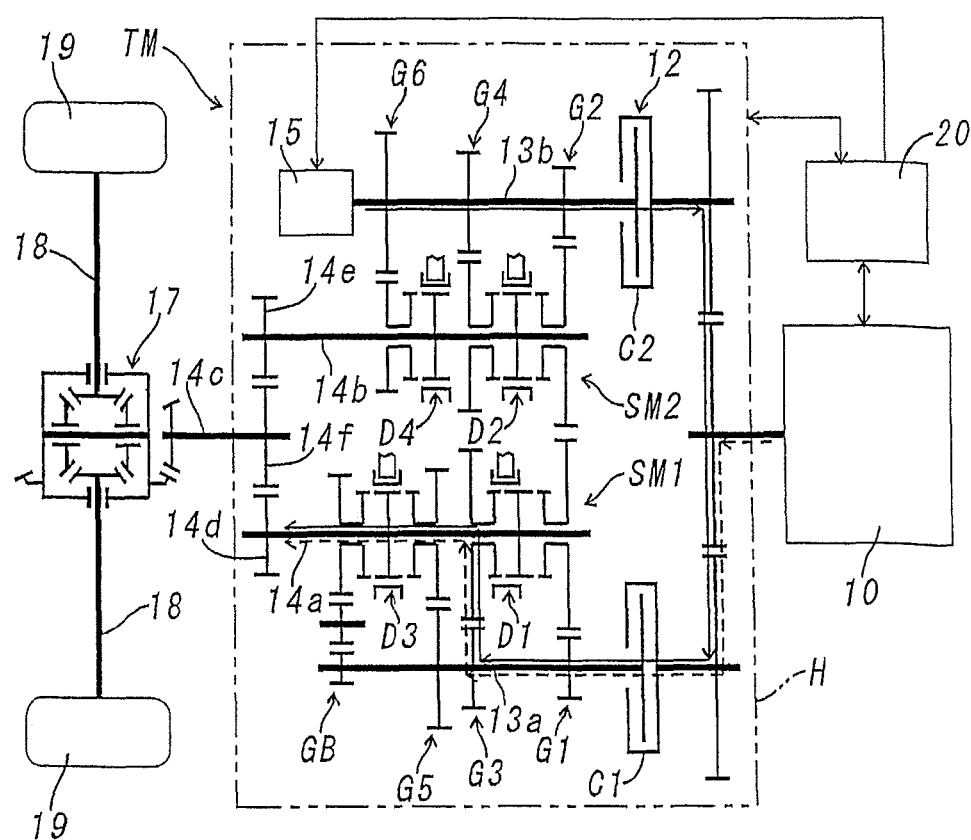
FIG. 5 is a skeleton view illustrating a condition where driven members are drive by the engine and a motor-generator activated as an electric motor through the first and second clutches and through the first gear-shift mechanism in the embodiment shown in FIG. 1.
Figure 6:
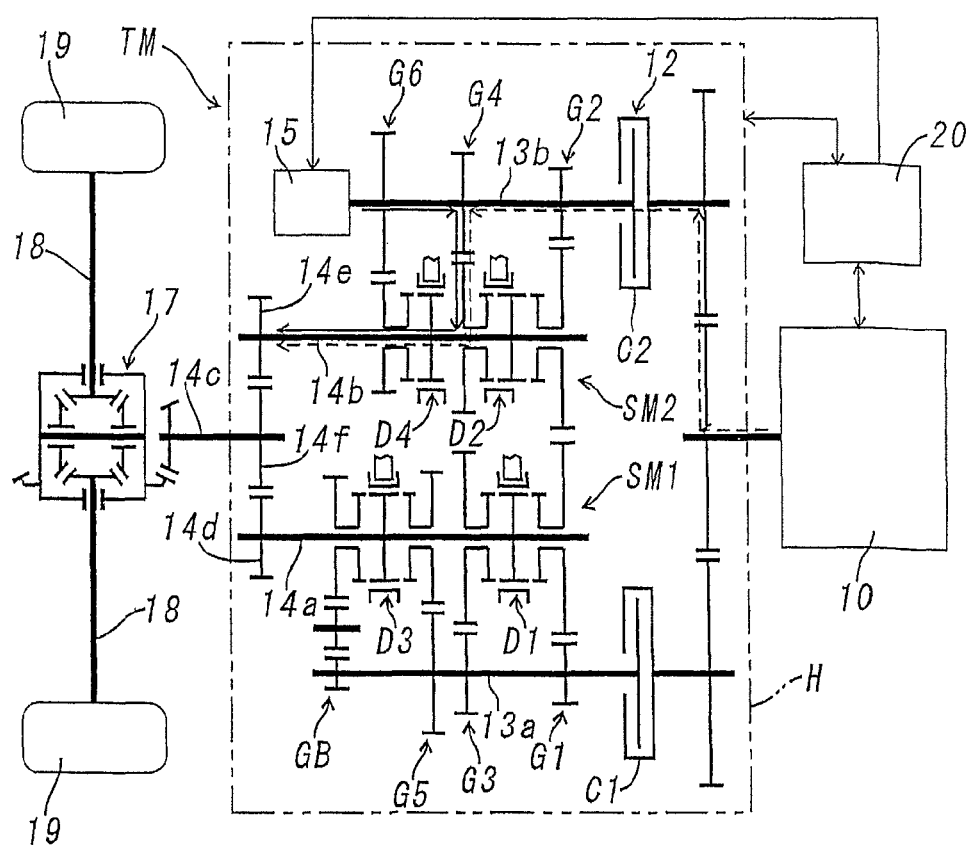
FIG. 6 is a skeleton view illustrating a condition where driven members are driven by the engine and the motor-generator activated as the electric motor through the second friction clutch and the second gear-shift mechanism.

As described above, the drive torque of engine 10 is transferred to the driven road wheels 19 in a condition where the driven road wheels 19 are driven by the drive torque of motor-generator 15. When the drive torque of motor-generator 15 is transferred to the driven road wheels 19 in a condition where the driven road wheels 19 are driven by the drive torque of engine 10 as shown in FIGS. 2 and 3, the controller 20 executes the same control as described above to effect the transfer path of drive power to the driven road wheels 19 as shown in FIGS. 5 and 6. In such a situation, the drive road wheels 19 are driven by the drive torque of engine 10 and the drive torque of motor-generator 15.

In the case that the foregoing prior art is applied to the hybrid drive power apparatus shown in FIG. 1, the transfer of drive power from engine 10 is effected by the steps of alternately engaging the first and second friction clutches C1 and C2 and shifting the shift step for change-speed in the first and second gear-shift mechanisms as in the same manner shown in FIGS. 2 and 3, while the transfer of drive power from motor-generator 15 is effected by shifting the shift step for change-speed in the second gear-shift mechanism only as in the same manner shown in FIG. 4. Accordingly, in transmission of the drive torque of engine 10 and motor-generator 15, the transfer of drive torque from the engine 10 to the driven road wheels 19 is effected through the first friction clutch C1 in shifting operation of the first gear-shift mechanism SM1 (as shown by an arrow of broken line in FIG. 7) and is effected through the second friction clutch C2 in shifting operation of the second gear-shift mechanism SM2 (as shown by an arrow of broken line in FIG. 6. Also, the transfer of drive torque from motor-generator 15 to the driven road wheels 19 is effected by shifting of the second gear-shift mechanism SM2 only (as shown by an arrow of solid line in FIGS. 6 and 7 respectively).

Figure 7:
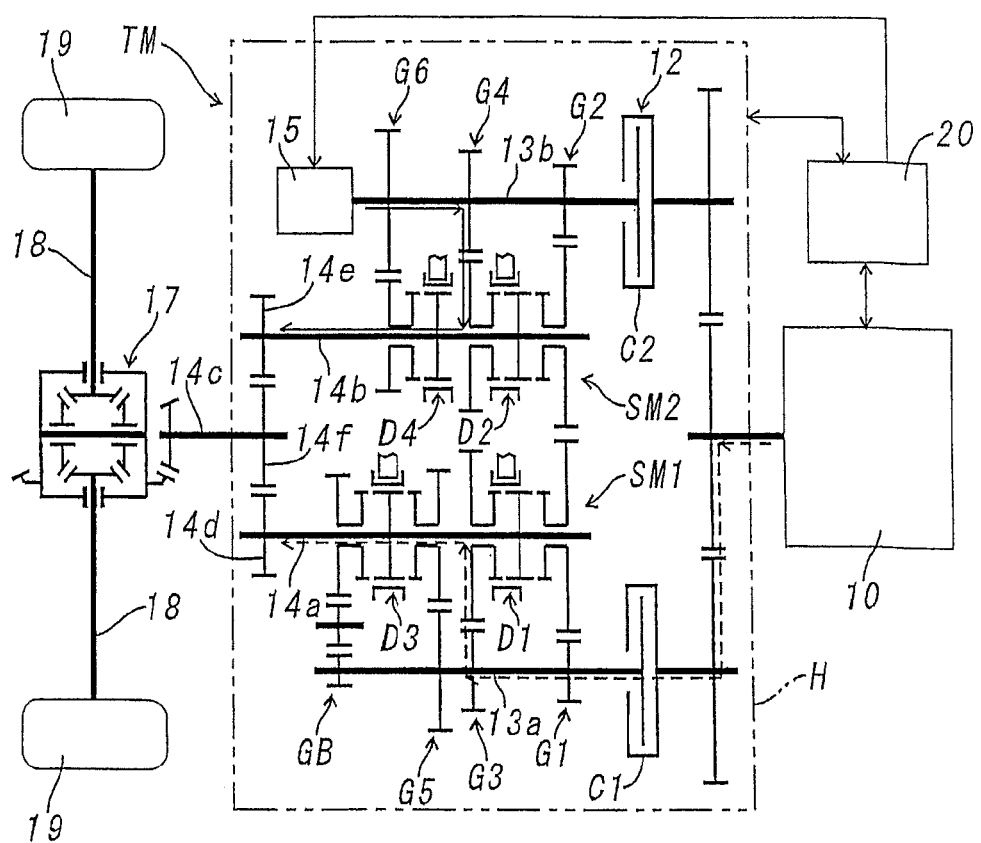
FIG. 7 is a skeleton view illustrating a condition where driven members are driven by an engine through a first friction clutch and a first gear-shift mechanism and driven by a motor-generator activated as an electric motor through a second friction clutch in a prior art.

In the transfer of drive power shown in FIG. 6, there is not any problem as in the embodiment described above. However, in a condition where the first friction clutch C1 is brought into engagement to transfer the drive torque of engine 10 to the driven road wheels 19 through the first gear-shift mechanism SM1 as shown in FIG. 7, a change-speed ratio between the final output shaft 14c drivingly connected the first gear-shift mechanism SM1 through the first friction clutch C1 and the clutch cover of second friction clutch C2 will differ from a change-speed ratio between the final output shaft 14c drivingly connected through the second gear-shift mechanism SM2 and the clutch plate of second friction clutch C2. This causes relative rotation of the clutch cover and the clutch plate in second friction clutch C2. Although the second friction clutch C2 is in a released condition in the operation mode shown in FIG. 7, drag torque will occur between the clutch cover and the clutch plate in second friction clutch C2. Such drag torque causes loss of drive power and increases particularly in a wet-type clutch, resulting in increase of the loss of drive power.

The loss of drive power caused by drag torque will occur not only in travel of the vehicle with the drive torque of engine 10 and motor-generator 15 but also in a condition where the vehicle is driven by the drive torque of engine10 while the motor-generator 15 is activated as a generator for charging the battery.

In the embodiment of the present invention, as shown in FIG. 5, the second friction clutch C2 is brought into engagement in a condition where the first friction clutch C1 has been brought into engagement to transfer the drive torque of engine 10 to the driven road wheels 19 through the first gear-shift mechanism SM1. In such an instance, both the engine 10 and motor-generator 15 are drivingly connected to the final output shaft 14c through the first gear-shift mechanism SM1. As the first and second friction clutches C1 and C2 are brought into engagement as described above, any relative rotation of the clutch cover and the clutch plate does not occur. This is useful to eliminate loss of the drive power caused by drag torque and to decrease fuel consumption rate. Although in the above situation, relative rotation will occur between a clutch hub L and an engagement member N respectively in the second and fourth changeover clutches D2 and D4, drag torque caused by the relative rotation may be substantially disregarded.

Figure 8:
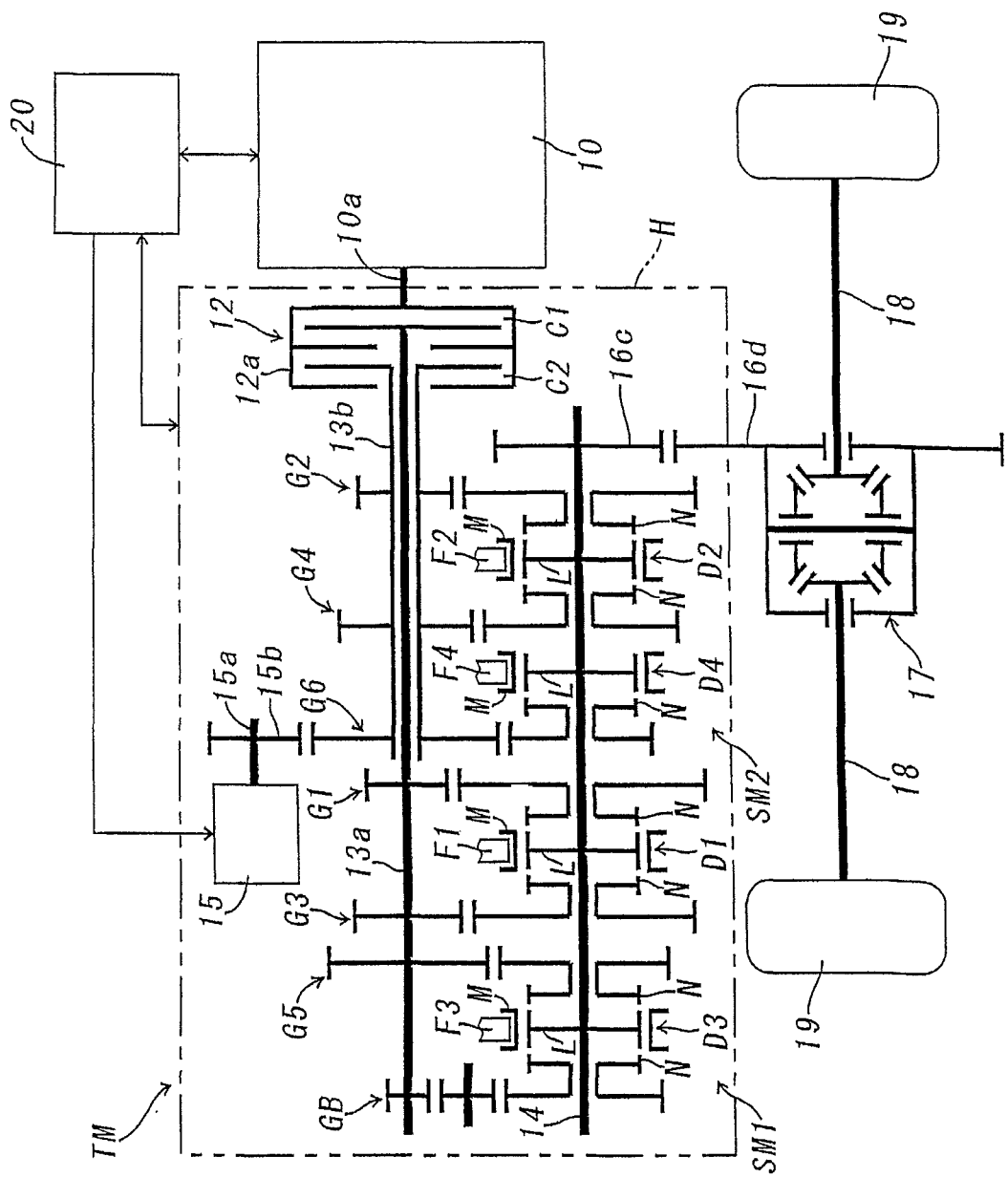
FIG. 8 is a skeleton view illustrating another embodiment of a hybrid drive power apparatus.

Illustrated in FIG. 8 is a modification of the hybrid drive power apparatus shown in FIGS. 1~6. This modification includes a dual-clutch type automatic power transmission of forward six speed steps and a backward step. In the automatic power transmission, first and second input shafts 13a and 13b are coaxially arranged to be driven by engine 10 through a dual-clutch 12 composed of first and second friction clutches C1 and C2. The second input shaft 13b is in the form of a tubular shaft in surrounding relationship with first input shaft 13a. The three output shafts 14a, 14b, 14c in the gear transmission TM shown in FIG. 1 are in the form of a single output shaft 14 in parallel with the coaxial first and second input shafts 13a, 13b. A clutch cover 12a of dual-clutch 12 is connected to the output shaft 10a of engine 10 so that the first and second input shafts 13a and 13b are driven by engine 10 through dual-clutch 12. The output shaft 14 is drivingly connected to the driven road wheels 19 through final reduction gears 16c, 16d, differential gear set 17 and axle shafts 18, 18. The first and second friction clutches C1 C2 in the form of the dual clutch are brought into engagement under control of the controller 20 in such a manner that the transfer torque in one way is increased and decreased in reverse relative to the transfer torque in the other way as in the automatic power transmission TM shown in FIG. 1.

The first gear-shift mechanism SM1 is arranged between rear half portions of first input shaft 13a and output shaft 14, and the second gear-shift mechanism SM2 is arranged between second input shaft 13b and output shaft 14. These gear-shift mechanisms SM1 and SM2 are substantially the same in construction as those in the first embodiment shown in FIG. 1. The motor-generator 15 is drivingly connected to the second input shaft 13b through a sixth speed gear set G6 in mesh with a gear 15b fixed to its output shaft 15a.

In this modification, the controller 20 controls the operation of the power transmission TM and the engine in the same manner as in the foregoing embodiment. When the second friction clutch C2 is brought into engagement under control of the controller 20 in a condition where the first friction clutch C1 on the first input shaft 13a is in engagement to transfer the drive torque of engine 10 to the output shaft 14 through the first gear-shift mechanism SM1, the motor-generator 15 is drivingly connected to the output shaft 14 through the second input shaft 13b, first and second friction clutches C1 and C2, first input shaft 13a and first gear-shift mechanism SM1. Accordingly, the drive torque of engine 10 and the drive torque of motor-generator 15 are transmitted to the final output shaft 14 through the first gear-shift mechanism SM1 in a condition where both the friction clutches C1 and C2 are in engagement. Thus, any relative rotation of the clutch cover and the clutch plate does not occur, resulting in decrease of loss of the drive power and fuel consumption rate.

DESCRIPTION OF REFERENCE NUMERALS

10 . . . Engine, 12 . . . Dual-clutch, 13a . . . First input shaft, 13b . . . Second input shaft, 14, 14a, 14b . . . Output shafts (First output shaft, Second output shaft), 15 . . . Motor-generator, 19 . . . Drive road wheels, 20 . . . Controller, C1 . . . First friction clutch, C2 . . . Second friction clutch, SM1 . . . First gear-shift mechanism, SM2 . . . Second gear-shift mechanism.

The invention claimed is:

1. A hybrid drive power apparatus of the type which comprises a first gear-shift mechanism assembled with a first input shaft to be applied with drive power from an engine through a first friction clutch, a second gear-shift mechanism assembled with a second input shaft to be applied with the drive power of the engine through a second friction clutch, a motor-generator in drive connection with the second input shaft, a final output shaft in drive connection with each output shaft of both the first and second gear-shift mechanisms, and a driven mechanism to be driven by drive power transferred from the final output shaft, wherein drive torque of the motor-generator activated as an electric motor is transferred to the final output shaft through a gear set at a shift step selected in the second gear-shift mechanism, wherein the hybrid drive power apparatus includes control means for activating the motor-generator as the electric motor to start the engine in a condition where the second friction clutch has been brought into engagement to transfer drive torque of the motor-generator to the engine, for disengaging the second friction clutch after start of the engine and for engaging both the first and second friction clutches when either one of the shift steps in the first gear-shift mechanism is selected to transfer the drive torque of the engine and the motor-generator to the final output shaft through a gear set at the selected shift step in the first gear-shift mechanism.

2. A hybrid drive power apparatus of the type which comprises a first gear-shift mechanism assembled with a first input shaft to be applied with drive power from an engine through a first friction clutch, a second gear-shift mechanism assembled with a second input shaft to be applied with the drive power of the engine through a second friction clutch, a motor-generator in drive connection with the first input shaft, a final output shaft in drive connection with each output shaft of both the first and second gear-shift mechanisms, and a driven mechanism to be driven by drive power transferred from the final output shaft, wherein drive torque of the motor-generator activated as an electric motor is transferred to the final output shaft through a gear set at a shift step selected in the first gear-shift mechanism, wherein the hybrid drive power apparatus includes control means for activating the motor-generator as the electric motor to start the engine in a condition where the first friction clutch has been brought into engagement to transfer drive torque of the motor-generator to the engine, for disengaging the first friction clutch after start of the engine and for engaging both the first and second friction clutches when either one of the shift steps in the second gear-shift mechanism is selected to transfer the drive torque of the engine and the motor-generator to the final output shaft through a gear set at the selected shift step in the second gear-shift mechanism.

3. A hybrid drive power apparatus as claimed in claim 1, wherein the first gear-shift mechanism is provided with gear sets of odd shift steps for change-speed, and the second gear-shift mechanism is provided with gear sets of even shift steps for change-speed.

* * * * *